United States Patent [19]

Cull

[11] 3,997,476

[45] Dec. 14, 1976

[54] ALUMINA TREATMENT

[75] Inventor: Neville L. Cull, Baker, La.

[73] Assignee: Exxon Research and Engineering Company, Linden, N.J.

[22] Filed: July 8, 1975

[21] Appl. No.: 593,952

[52] U.S. Cl. .............................. 252/463; 423/626; 423/628

[51] Int. Cl.$^2$ ......................................... B01J 21/04

[58] Field of Search ............ 252/463; 423/626, 628

[56] References Cited

UNITED STATES PATENTS

| 3,031,418 | 4/1962 | Bugosh | 423/625 X |
|---|---|---|---|
| 3,493,325 | 2/1970 | Roth | 252/463 X |
| 3,836,561 | 9/1974 | Young | 252/463 X |
| 3,917,808 | 11/1975 | Leach et al. | 252/463 X |

Primary Examiner—W. J. Shine
Attorney, Agent, or Firm—Marthe L. Gibbons

[57] ABSTRACT

High pore volume alumina materials which are particularly effective catalyst supports are prepared by treating a calcined alumina with an organic acid such as ethanedioic acid. The acid treatment changes the pore structure of the alumina and particularly increases the macroporosity of the alumina.

18 Claims, No Drawings

ALUMINA TREATMENT

BACKGROUND OF THE INVENTION

1. Field of the Invention

The present invention relates to a method for forming high pore volume alumina materials that also have relatively large average pore diameters. More particularly, the present invention relates to a process for increasing the macroporosity of an alumina by treatment of the alumina with an aqueous solution of an organic acid.

2. Description of the Prior Art

Alumina is a known article of commerce. High purity alumina is widely employed as the support or carrier in various catalyst compositions. Many methods are employed for the preparation and/or purification of catalyst grade alumina. Prior art workers have also disclosed processes for treating alumina materials with various acids. For example, Leach in U.S. Pat. No. 3,846,540 discloses a treatment of low porosity alumina with an aqueous solution of a monofunctional acid followed by precipitation with a base. Graulier in U.S. Pat. No. 3,628,914 discloses treating pellets of alumina with an aqueous medium of an organic or inorganic acid at a temperature greater than 100° C.

It has now been found that changes in the pore structure of alumina particularly an increase in the macroporosity, that is, in the porosity and pore volume in larger pores, can be effected by treatment with an aqueous solution of certain organic acids.

SUMMARY OF THE INVENTION

In accordance with the invention, there is provided a process for increasing the pore volume of an alumina, which comprises treating a calcined alumina having a relatively low pore volume with an aqueous solution comprising an organic acid selected from the group consisting of polycarboxylic acids, substituted polycarboxylic acids, hydroxy-substituted, monocarboxylic acids and amino-substituted monocarboxylic acids for a time sufficient to increase the pore volume of said calcined alumina.

DESCRIPTION OF THE PREFERRED EMBODIMENTS

A calcined alumina is treated with an aqueous solution containing an organic acid. The calcined alumina may be in the form of extrudates, pills, powders or preformed shapes such as saddles or rings. The organic acid used in the aqueous solution is selected from the group consisting of polycarboxylic acids, substituted polycarboxylic acids, hydroxy-substituted monocarboxylic acids and amino-substituted monocarboxylic acids. By way of example, suitable acids include dicarboxylic acids such as ethanedioic acid (oxalic acid), propanedioic acid, butanedioic acid, pentanedioic acid, cis-butenedioic acid (maleic acid); hydroxy-substituted monocarboxylic acids such as hydroxyethanoic acid (glycolic acid); amino-substituted monocarboxylic acids such as aminoethanoic acid (glycine). The preferred organic acids are the dicarboxylic acids which may be saturated dicarboxylic acids having the general formula $C_nH_{2n}(COOH)_2$, for example, ethanedioc acid or the unsaturated dicarboxylic acids having the general formula $C_nH_{2n-2}(COOH)_2$. The more preferred organic acid utilized is ethanedioic acid. The acid may be present in the aqueous solution in amounts ranging from about 5 weight percent to about 50 weight percent, preferably from about 10 weight percent to about 20 weight percent. The acid treatment is conducted at a temperature below 100° C., preferably at a temperature ranging from ambient to about 95° C., more preferably at a temperature ranging from about 70° to about 85° C. The acid treatment is conducted for a period of time sufficient to obtain the desired increase in pore volume and increase in macropores. Suitable periods of time include from about 0.5 to about 72 hours, preferably from about 3 to about 5 hours. It should be noted that the effects of the acid treatment are related to time of treatment (duration), the temperature of treatment, the acid concentration used and the amount of alumina relative to the amount of acid. The optimum treating conditions necessary to effect the desired changes in macroporosity of the alumina being treated can be determined empirically. For example, treatment times of from about 2 to about 5 hours at a temperature ranging from about 65° to about 85° C. using 10 weight percent of a suitable organic acid such as ethanedioic acid in aqueous solution and with approximately an alumina to acid molar ratio ranging from about 0.5:1 to 10:1, preferably from about 1.5:1 to 3:1, will give the desired results.

It should also be noted that the acid treatment results in a solubilization of some of the alumina. The amount of alumina dissolved by the acid treatment is dependent on the severity and duration of the acid treatment and may range, for example, from about 10 to 20 weight percent of the calcined alumina charged to the treating zone. If desired, this solubilized alumina may be recovered from the solution by precipitation (with ammonia), evaporation, calcination and any other methods well known in the art.

After the calcined alumina has been acid treated, it is separated from the acid solution by filtration or decantation, washed, dried in air or in a vacuum oven and subsequently calcined, for example, at a temperature ranging from about 450° to about 550° C. for a period of time ranging from about 1 to about 16 hours. The acid treated calcined alumina may be composited with a sorption active or catalytically active metallic component such as a metal, metal oxide or metal sulfide, for example, by impregnation with a solution of the desired metallic component to produce hydrocarbon conversion catalysts or sorption active materials. Alternatively, the metallic component may be composited by impregnation with the acid treated alumina after the alumina has been separated from the acid solution, after the acid treated alumina washing step or after the acid treated alumina has been dried (for example at 95° to 100° C. for 1 to 2 hours under 2 to 26 inches Hg vacuum). The metal impregnated catalysts are usually calcined and may be reduced, sulfided, etc. to convert them to an active form.

EXAMPLE 1

Fifteen grams of a commercially available alumina, calcined 3 hours at 593° C, 10–20 mesh material was treated with a 10 weight percent solution (approximatey 1 molar) of ethanedioic (oxalic) acid in water (75 cc) for 3 hours at 75° C. The alumina was then filtered, washed several times with water and air dried. Subsequently, it was oven dried (2 to 2 hours at 93°–95° C., 20–26 inches Hg vacuum) and finally calcined for 3 hours at 538° C. (temperature brought up slowly to 538° C. over a period of about 4 hours). The sample was then submitted for surface area and pore volume measurements. Results of the analysis are reported in Table I (run 3) in which the abbreviation S.A., P.V. and R.P. denote, respectively, BET surface area, BET pore volume, pore radius, and AV.RP denotes average pore radius.

alumina to be designated "C", of an untreated alumina to be designated "D" and of an alumina treated with water only to be designated "E" as control. Results are shown in Table II.

TABLE II

| Run No. | 6 | 7 | 8 |
|---|---|---|---|
| Alumina | D | E<br>H₂O Treat | C<br>Oxalic Acid |
| Treatment | None | 3 hrs. at 85° C. | Treat 2 hrs. at 85° C. |
| Inspections[1] | | | |
| S.A. (BET), m²/g | 254 | 226 | 248 |
| P.V. (BET), cc/g | .80 | .77 | 1.13 |
| P.D., A (calc.) | 126 | 136 | 182 |
| Pore Volume Distribution | | | |
| 0–50 A, % of PV | 11.0 | 8.6 | 6.5 |
| 50–100 A, % of PV | 16.8 | 17.1 | 14.4 |
| 100–200 A, % of PV | 26.5 | 25.1 | 25.9 |
| 200–300 A, % of PV | 17.9 | 18.3 | 20.8 |
| 300–400 A, % of PV | 13.0 | 14.0 | 15.2 |
| 400–600 A, % of PV | 14.9 | 17.0 | 17.3 |

[1]S.A., P.V. and P.D. denote, respectively, surface area, pore volume and pore diameter.

TABLE I

Oxalic Acid Treatment of Alumina
(10% Aqueous Oxalic Acid Solution)

| Run | 1 | 2 | 3 | 4 | 5 |
|---|---|---|---|---|---|
| Treatment | None | Water Only | Oxalic Acid | | |
| Time, Hrs. | — | 3 | 3 | 3 | 5 |
| Temp., °C | — | 65 | 70–75 | 85 | 85 |
| Physical Properties | | | | | |
| S.A. m²/g (BET) | 208 | 203 | 207 | 213 | 219 |
| P.V. cc/g (BET) | .70 | .68 | .85 | .95 | .99 |
| P.R. A (Calc.) | 68 | 67 | 82 | 89 | 91 |
| MERPOR[1] | | | | | |
| Porosity, % | 15.7 | 14.9 | 20.9 | 23.8 | 29.0 |
| P.V., cc/g | .15 | .15 | .24 | .27 | .38 |
| PVADS[2] | | | | | |
| Av. R.P. A | 82 | 76 | 101 | 105 | 116 |
| P.V., cc/g | .58 | .66 | .72 | .64 | .81 |
| Vol. % Pores> 100 A | 35 | 28 | 51 | 53 | 60 |

[1]MERPOR denotes mercury porosimeter
[2]PVADS denotes pore volume distribution by ADSORPTOMAT (AMINCO)

In Table I, run 1 is a control run in which the calcined alumina was not subjected to an acid treatment. Run 2 is a run in which the calcined alumina was treated with water only for three hours, and runs 4 and 5 are runs in which the calcined alumina was treated with oxalic acid at 85° C. for periods of 3 and 5 hours. As can be seen from the data of Table I, the runs in accordance with the process of the present invention, that is, runs 3, 4 and 5, show that pore volume is being increased and that the average radius of the pores is being increased.

The run with water only (run 2) shows that the observed effect in runs 3 to 5 is not due to "steaming" treatment since the results of run 2 are not better than the results obtained with control run 1.

EXAMPLE 2

A series of experiments were made which show that the oxalic acid treatment causes changes in the pore structure of the alumina, as follows: a sample of a commercially available alumina, calcined for 3 hours at 538° C. was treated with oxalic acid (10 weight percent solution for 2 hours at 85° C.). The oxalic acid solution was decanted and the alumina (1/16 inch extrudate) washed by decantation with water. The alumina was air dried overnight, vacuum oven dried 1 hour at 100° C. (20–26 inches Hg vacuum) and then calcined for 3 hours at 538° C. Physical inspections were made of this

EXAMPLE 3

Twenty grams (20.17 g) of a commercially available alumina in the form of ⅛ inch extrudates which had been previously calcined 16 hours at 538° C. was treated with 100 cc. of a 10 weight percent solution of maleic acid (cisbutenedioic acid) at 85° C. for 3 hours. The acid treated alumina was filtered, water washed several times and allowed to air dry for about 2 days. The air dried alumina was subsequenty calcined for 3 hours at 538° C. before it was submitted for surface area and pore volume analyses. The weight of calcined acid treated alumina recovered was 18.12 grams, that is, 89.8 weight percent. Data obtained are shown in Table III (run 9) as well as data on untreated alumina (run 10) used for comparison. As can be seen, while the changes obtained with maleic acid treatment are not as extensive as those obtained with oxalic acid treatment, the results (run 9) show that maleic acid treatment increased the porosity and pore volume of the alumina.

TABLE III

Maleic Acid Treatment of Alumina (⅛" extrudates)

| Run | 9 | 10 |
|---|---|---|
| Treatment | 10% maleic acid solution | none |
| Time, hrs. | 3 | — |
| Temp., °C. | 85 | — |
| Physical Properties | | |
| S.A. (m²/g)(BET) | 211 | 212 |
| P.V. (cc/g)(BET) | 0.78 | 0.67 |
| P.R., A (calc.) | 74 | 63 |
| MERPOR[1] | | |
| Porosity, % | 17.7 | 13.1 |
| P.V. (cc/g) | 0.20 | 0.13 |
| S.A. (m²/g) | 19.5 | 10.9 |
| PVADS[2] | | |
| A.V. R.P., A | 101 | 89 |
| P.V. (cc/g) | 0.65 | 0.55 |
| Vol. % Pores > 100 A | 51 | 43 |

[1]MERPOR denotes mercury porosimeter
[2]PVADS denotes pore volume distribution by ADSORPTOMAT (AMINCO)

EXAMPLE 4

Approximately twenty grams (20.13 g) of a commercially available alumina in the form of ⅛ inch extrudates, which had been previously calcined for 16 hours at 538° C. was treated with 160 cc. of a 10 weight percent solution of glycolic acid (hydroxyethanoic acid) for 3 hours at 85° C. The treated alumina was decanted, water washed several times and allowed to air dry overnight prior to calcining it for 3 hours at 538° C. The weight of alumina extrudates recovered after the calcination was 17.17 grams (85.3 wt. %). Data obtained on the physical properties of the glycolic acid treated alumina are shown in Table IV, run 11. Data obtained on untreated alumina extrudates are shown in Table IV, run 10.

TABLE IV

Glycolic Acid (10 %) Treated Alumina

| Run | 10 | 11 |
|---|---|---|
| Treatment | none | 10% glycolic acid |
| Time, hrs. | — | 3 |
| Temp., ° C. | — | 85 |
| Physical Properties | | |
| S.A. (m²/g)(BET) | 212 | 214 |
| P.V. (cc/g)(BET) | 0.67 | 0.84 |
| P.R., A (calc.) | 63 | 79 |
| MERPOR[1] | | |
| Porosity, % | 13.1 | 19.9 |
| P.V. (cc/g) | 0.13 | 0.24 |
| S.A. (m²/g) | 10.9 | 23.0 |
| PVADS[2] | | |
| AV. R.P., A | 89 | 102 |
| P.V. (cc/g) | 0.55 | 0.67 |
| Vol. % pores > 100 A | 43 | 51 |

[1]MERPOR denotes mercury porosimeter
[2]PVADS denotes pore volume distribution by ADSORPTOMAT (AMINCO)

EXAMPLE 5

A series of tests were made in which a commercially available hydrotreating catalyst comprising calcined alumina, 3 percent CoO and 20 percent $MoO_3$ in the form of 1/16 inch extrudate, hereinafter designated catalyst A, and a commercially available calcined alumina 1/16 inch extrudate which was first treated with a 10 weight percent solution of oxalic acid at a temperature of 85° C. for a period of 2 hours, calcined and subsequently impregnated with cobalt-molybdenum components to result in a catalyst containing 6 percent CoO and 20 percent $MoO_3$, hereinafter to be designated catalyst B. Catalysts A and B were then used in a process for hydrodesulfurization and demetallization in which a heavy petroleum crude oil (Jobo crude) was treated at start-of-run temperature of 750° F. under a hydrogen pressure of 2250 psig at a space velocity of 1 volume of crude oil per hour per 1 volume of catalyst (1V/hr./V). Results of the physical characteristic measurements of catalysts A and B and results of the heavy crude hydrotreating tests are tabulated in Table V. As can be seen from the data in Table V, catalyst B which was made in accordance with the present invention shows improved demetallization as shown by the fact that the rate constant for vanadium removal is greater by a factor of 2 for catalyst B. Desulfurization rates were essentially equivalent. It should be noted that the life of demetallization catalysts is related to the amount of metals picked-up so that catalysts with larger pore volumes, particularly in the larger size pores would be expected to have a longer life.

TABLE V

| Catalyst | A | B |
|---|---|---|
| SA | 193 | 236 |
| PV | 0.58 | 0.87 |
| Pore Diameter (calc.), A | 120 | 147 |
| HPH Test Results[1] | | |
| $2K_{700}$ $S^{(2)}$ at 10 hrs. | 0.62 | 0.61 |
| $2K_{700}$ $V^{(3)}$ at 10 hrs. | 0.73 | 1.31 |

[1]HPH denotes high pressure hydrotreating
[2]$2K_{700}S$ denotes rate constant for desulfurization
[3]$2K_{700}V$ denotes rate constant for demetallization

What is claimed is:
1. A process for increasing the pore volume of an alumina, which comprises treating a calcined alumina having a relatively low pore volume with an aqueous solution consisting of an organic acid selected from the group consisting of polycarboxylic acids, hydroxy-substituted monocarboxylic acids and amino-substituted monocarboxylic acids, for a time sufficient to increase the pore volume of said calcined alumina, drying the acid treated alumina, and calcining the dried alumina.
2. The process of claim 1 wherein said organic acid is a dicarboxylic acid.
3. The process of claim 2 wherein said dicarboxylic acid is ethanedioic acid.
4. The process of claim 2 wherein said dicarboxylic acid is cis-butenedioic acid.
5. The process of claim 1 wherein said acid treatment is conducted at a temperature below 100° C.
6. The process of claim 1 wherein said acid treatment is conducted at a temperature ranging from ambient to about 95° C.
7. The process of claim 1 wherein said acid treatment is conducted for a period ranging from about 0.5 to about 72 hours.
8. The process of claim 1 wherein said aqueous solution comprises from about 5 to about 50 weight percent of said acid.
9. The process of claim 1 wherein the molar ratio of said calcined alumina to said acid ranges from about 0.5:1 to 10:1.
10. The process of claim 1 which comprises the additional steps of recovering said acid treated calcined alumina from said solution and calcining the recovered acid treated alumina.
11. The process of claim 1 which comprises the additional steps of recovering said acid treated alumina from said solution and compositing said recovered acid treated alumina with a catalytically active metallic component.
12. A process for increasing the pore volume of an alumina, which comprises treating a calcined alumina having a relatively low pore volume with an aqueous solution consisting of ethanedioic acid, at a temperature ranging from about 70° to about 85° F., for a period of time ranging from about 3 to about 5 hours, drying the acid treated alumina, calcining the dried alumina, and recovering an alumina having an increased pore volume.
13. The process of claim 12 wherein said ethanedioic acid comprises from about 5 to about 50 weight percent of said solution.
14. A process for increasing the pore volume of an alumina, which comprises treating a calcined alumina having a relatively low pore volume with an aqueous solution consisting of an organic acid selected from the group consisting of ethanedioic acid, cis-butenedioic acid, hydroxyethanoic acid and aminoethanoic acid at a temperature below 100° C. for a time sufficient to increase the pore volume of said calcined alumina, drying the acid treated alumina, and calcining the dried alumina.

15. A process for increasing the pore volume of an alumina, which comprises treating a calcined alumina having a relatively low pore volume with an aqueous solution comprising an organic acid selected from the group consisting of hydroxyethanoic acid and aminoethanoic acid, for a time sufficient to increase the pore volume of said calcined alumina, drying the acid-treated alumina and calcining the dried alumina.

16. The process of claim 11 wherein said catalytically active metallic component is selected from the group consisting of metal, metal oxide and metal sulfide.

17. A process for increasing the pore volume of an alumina, which comprises treating a calcined alumina having a relatively low pore volume with an aqueous solution comprising hydroxyethanoic acid, for a time sufficient to increase the pore volume of said calcined alumina, drying the acid treated alumina, and calcining the dried alumina.

18. A process for increasing the pore volume of an alumina, which comprises treating a calcined alumina having a relatively low pore volume with an aqueous solution comprising aminoethanoic acid, for a time sufficient to increase the pore volume of said calcined alumina, drying the acid-treated alumina, and calcining the dried alumina.

* * * * *